United States Patent
Reinartz et al.

(10) Patent No.: US 6,283,732 B1
(45) Date of Patent: Sep. 4, 2001

(54) HYDRAULIC UNIT

(75) Inventors: Hans-Dieter Reinartz, Frankfurt; Dieter Dinkel, Eppstein/Ts.; George Sonnenschein, Eschborn; Stephan Risch, Weiterstadt, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/445,748

(22) PCT Filed: Jun. 5, 1998

(86) PCT No.: PCT/EP98/03383

§ 371 Date: Apr. 7, 2000

§ 102(e) Date: Apr. 7, 2000

(87) PCT Pub. No.: WO98/56630

PCT Pub. Date: Dec. 17, 1998

(30) Foreign Application Priority Data

Jun. 13, 1997 (DE) .............................................. 197 25 092

(51) Int. Cl.[7] ..................................................... F04B 17/04
(52) U.S. Cl. .................. 417/440; 303/116.4; 303/119.2; 303/113.1; 303/116.1
(58) Field of Search ......................... 417/440; 303/116.4, 303/119.2, 113.1, 116.1

(56) References Cited

U.S. PATENT DOCUMENTS

| | | |
|---|---|---|
| 4,828,335 | 5/1989 | Fuller et al. . |
| 5,022,717 | 6/1991 | Heibel et al. . |
| 5,362,141 * | 11/1994 | Beck et al. .......................... 303/119.2 |
| 5,449,226 * | 9/1995 | Fujita et al. ........................ 303/116.4 |
| 5,975,653 * | 11/1999 | Zaviska .............................. 303/116.4 |

FOREIGN PATENT DOCUMENTS

| | | |
|---|---|---|
| 42 34 013 | 4/1994 | (DE) . |
| 43 06 222 | 9/1994 | (DE) . |
| 44 24 082 | 1/1996 | (DE) . |
| 44 31 250 | 3/1996 | (DE) . |
| 0 379 957 | 8/1990 | (EP) . |
| 0 699 571 | 3/1996 | (EP) . |
| 0 770 530 | 5/1997 | (EP) . |
| 2 253 665 | 9/1992 | (GB) . |

* cited by examiner

Primary Examiner—Charles G. Freay
Assistant Examiner—E D Hayes
(74) Attorney, Agent, or Firm—Rader, Fishman & Grauer PLLC

(57) ABSTRACT

A pump, electromagnetically operable valves and at least one low-pressure accumulator are arranged in a valve block. The valve actuators are disposed in front of a base of the valve block opposite to an electric motor which drives the pump. The housing of the low-pressure accumulator is formed of an add-on piece which is deepdrawn from sheet metal in a bowl-type configuration. The edge of the add-on piece is attached in the mouth of a blind-end bore in the valve block. The add-on piece projects beyond the and has roughly the same height as the actuators of the valves. The actuators and the add-on pieces are covered by a housing cap on the valve block which protects them against environmental influences. The arrangement is extremely compact and permits achieving a relatively small and, thus, light-weight valve block.

13 Claims, 2 Drawing Sheets

HYDRAULIC UNIT

TECHNICAL FIELD

The present invention relates to vehicle brake systems and more particularly relates to hydraulic pumps used in vehicle brake systems.

BACKGROUND OF THE INVENTION

Hydraulic units of this type are, among others, made use of in brake slip control systems. In these cases, the valve block also has a piston pump which is driven by an electric motor flanged to the valve block. As an example, the hydraulic unit described in U.S. Pat. No. 50,227,171 is referred to. In the version described in this patent, the low-pressure accumulator is integrated completely in the valve block which means that the accumulator piston is guided in a blind-end bore in the valve block which is closed by a plate screwed to the corresponding lateral surface of the valve block. The accumulator spring is arranged between the accumulator piston and the plate. The depth of the blind-end bore is determined by the axial extension of the accumulator piston and the accumulator spring length which, in turn, corresponds to the maximum absorption volume of the low-pressure accumulator that is required to be provided for the respective system. Among other things, care should be taken that, even with a maximally filled low-pressure accumulator, the accumulator pressure must not reach an excessive value. For this reason, for example, the accumulator spring must not be compressed to its coil bound length. Taking these conditions into account, there is a space requirement for the low-pressure accumulator which is significantly larger than the maximum volume absorption. This is in contrast to the requirement of minimizing the valve block under weight and space aspects.

European patent application No. 0 770 530 describes a hydraulic unit which has a housing cap on an end surface of a valve block which covers the low-pressure accumulator provided in the end surface and a plurality of valves. The low-pressure accumulator is plunged entirely into a bore in the valve block and furnished with a cover that extends between the housing cap and the end surface of the valve block into the hollow space of the housing cap.

Generic German patent application No. 42 34 013 discloses a hydraulic unit having a low-pressure accumulator which is closed with a cap-shaped add-on piece on one lateral surface of the valve block. Several electromagnetically operable valves are arranged on an end surface of the valve block which extends rectangularly to the lateral surface, and a bore extends through the valve block to provide a cable duct for connecting an electric motor. The positioning of the low-pressure accumulator and the valves on different housing surfaces and the necessity of making a through-bore for the cable duct limit the possibility of reducing the dimensions of the unit and simplifying its manufacture.

Therefore, an object of the present invention is to render the hydraulic unit of the type disclosed, by simple means, still smaller and lighter in weight than has been provided by the previously suggested solution.

Favorably, the accumulator piston is guided in the add-on piece, and part of the housing of the low-pressure accumulator, which is formed by the valve block itself, radially encloses a volume that corresponds roughly to the maximum accumulator volume of the low-pressure accumulator.

An accordingly configured low-pressure accumulator is especially appropriate when the number of valves integrated in the valve block and required for pressure control is small. It is arranged for in the state of the art to position the valve actuators side by side on a base of the valve block. In a system with a reduced number of valves, there remains an area into which the add-on piece can project in the space beside the valve block where the actuators are arranged.

Usually, the actuators are covered by a housing cap on the valve block which, among others, also accommodates the electronic control unit. In the proposed arrangement, the low-pressure accumulator is accommodated in the space enclosed by the housing cap and, thus, protected against outer influences. Among others, this permits designing the add-on piece like a bowl deepdrawn from sheet metal which is inserted into a flat blind-end bore in the valve block. The add-on piece has an outwardly directed flange-like beaded rim which, additionally, is used as an abutment surface for a sealing ring disposed in a step-like expansion of the blind-end bore.

The accumulator piston is also deepdrawn from metal in a bowl-type configuration, and the add-on piece and the accumulator piston, aligned with their open sides towards each other, are inserted into each other. The space enclosed by the accumulator piston and the add-on piece accommodates the accumulator spring which is supported on the bottom of the accumulator piston, on the one hand, and on the bottom of the add-on piece, on the other hand.

The accumulator chamber which is enclosed by the accumulator piston in the blind-end bore in the valve block, by way of a straight bore, is in connection with a transverse bore in the valve block. The transverse bore in which a pump piston is guided opens into a damping chamber. Inserted into the mouth of the connecting bore into the accumulator chamber is a non-return valve which represents the pump suction valve for the pump. The pump pressure valve of this pump is also configured as a non-return valve and inserted into the mouth of the transverse bore into the damping chamber.

In parallel to the transverse bore, a connecting bore extends between the damping chamber and a pressure fluid channel in the valve block and is narrowed in an orifice-type fashion directly in front of where it opens into the channel.

The electric motor projects from a lateral surface of the valve block so that a connecting cable, starting from the bearing plate of the motor housing, can be passed by the side of the valve block and guided to the electronic controller that is arranged within the housing cap.

To protect the cable connection against outer influences, the housing cap has an extension which passes by the valve block up to the bearing plate. Together with the side wall of the valve block, the extension forms a channel through which the electrical connecting cable is conducted.

DETAILED DESCRIPTION OF THE PREFERRED EMBODIMENTS

Figure 1:
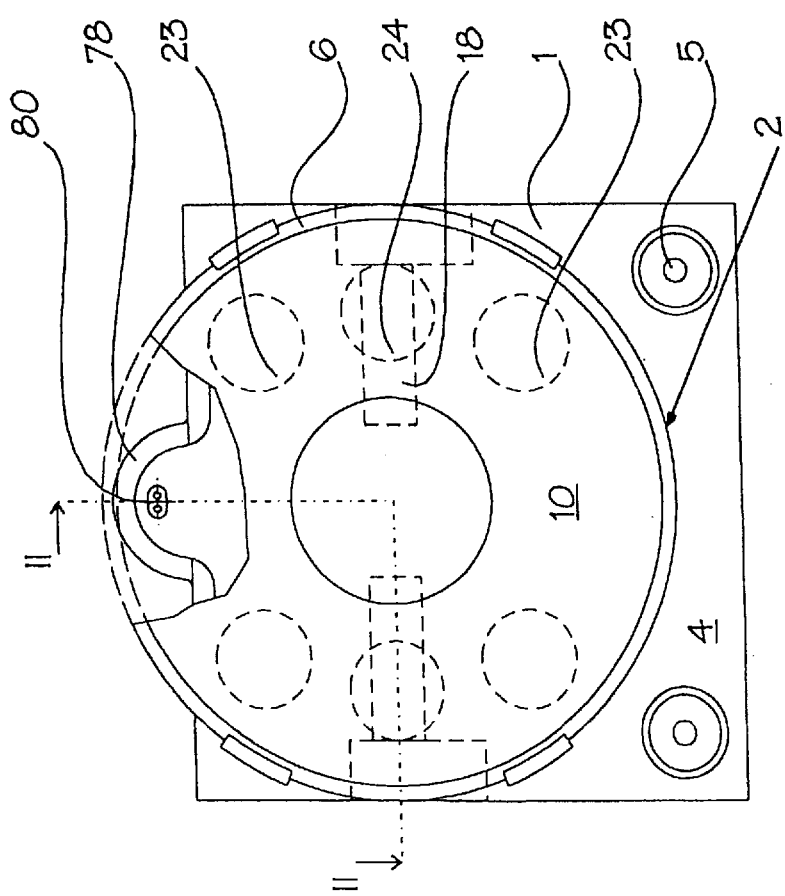
FIG. 1 is a top view of the valve block of the present invention.

Initially, reference is being made to the embodiment of FIG. 1. A valve block 1 has a roughly square lateral extension. An electric motor 2 is positioned with its bearing plate 3 on a square base 4 of the valve block, offset from the central axis, so that the bearing plate 3 on one side projects beyond the base 4. Wheel connections 5 are provided on the free surface portion, not covered by the electric motor 2, on the other side of the base 4. The housing 10 of the electric motor 2 is retained on the valve block 1 by caulked portions which grip over a flange-like edge 6 of the housing 10.

Figure 2:
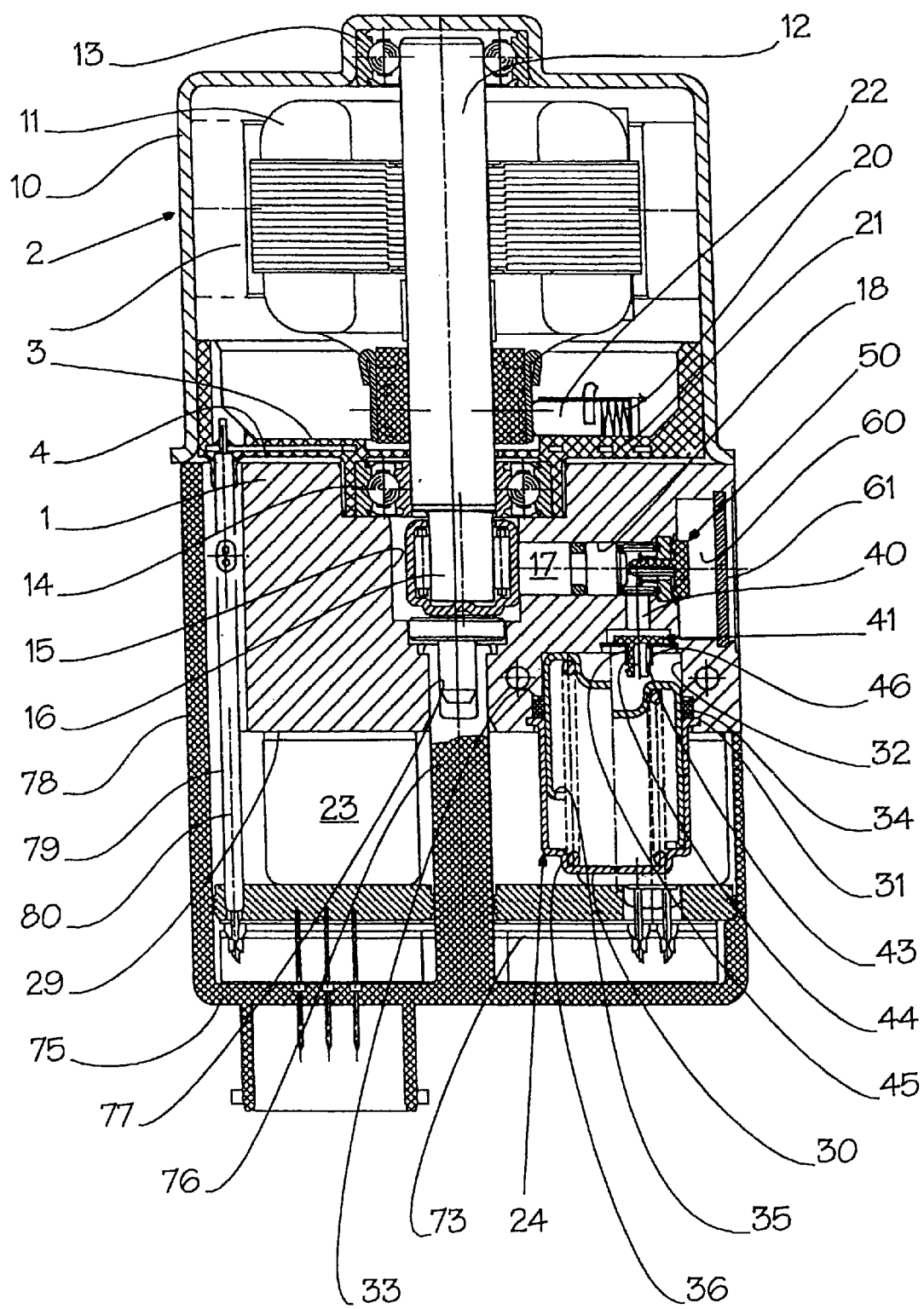
FIG. 2 is a cross-section taken along line II—II of FIG. 1.

The embodiment of FIG. 2 shows a cross-section taken along the angular line II—II, i.e., the two halves of the drawing are perpendicular to one another. Valve block 1 is illustrated centrically, and electric motor 2 is mounted and attached on its top base 4, as has been explained hereinabove. Motor 2 comprises a bowl-shaped housing 10 with permanent magnets on its inside, bearing plate 3, and a rotor 11 with a shaft 12 which is mounted in a first bearing 13 in the bottom of the housing 10 and a second bearing 14 in the bearing plate 3. Shaft 12 of rotor 11 projects through the bearing plate 3 into a stepped bore 15 in the valve block and carries on its end an eccentric 16. Supported on eccentric 16 are two pump pistons 17 which are guided in transverse bores 18 and define a pump chamber 19 each. The transverse bores 18 open into the portion of a stepped bore 15 which accommodates the eccentric 16 of the motor shaft 12. Due to the angular cross-section chosen, only one transverse bore 18 with a pump piston 17 can be seen in FIG. 2. The two bores 18 are shown in dash-dot lines in FIG. 1.

The bearing plate 3 is additionally used as a brush holder plate. Therefore, two or, if necessary, four brush cases 20 are disposed on the inside of the bearing plate 3. The electrical connection to brushes 22 guided in the cases 20 is established by way of metal conductive tracks 21 which are provided in the bearing plate 3 made of plastics. On its outside, the bearing plate 3 has sealing lips (not shown) which are in abutment with the top base of the valve block 1 and prevent the ingress of moisture into the stepped bore 15.

On the bottom base 29 opposite to the top base 4 of the valve block 1, several valve actuators, i.e. magnetic coils 23, are arranged which are respectively slipped onto a closed bushing disposed on the valve block 1. In the inside of the bushing, respectively one magnetic core and one armature is attached and guided to actuate valves in the valve block 1. Further, there is provision of two low-pressure accumulators 24, one of which is illustrated in FIG. 2. The housing is comprised of an add-on piece 30 which is configured as a bowl-shaped deepdrawn part. The edge 31 of the add-on piece is beaded outwardly and inserted and caulked in the mouth of a blind-end bore 32 in the valve block 1, with the wall of the blind-end bore 32 being in alignment with the wall of the add-on piece 30. The blind-end bore 32 is steplike enlarged, and the walls of the step 33 and the beaded edge 31 form a groove in which a sealing ring 34 is positioned.

The accumulator piston 35 is also configured as a bowl-shaped deepdrawn part which, with its open side, is inserted into the open side of the add-on piece 30 so as to produce a closed chamber that can be ventilated through a bore in the bottom of the add-on piece 30. The chamber houses the accumulator spring 36 of the low-pressure accumulator 24 which is supported on the bottom of the accumulator piston 35 on one side and on the bottom of add-on piece 30 on the other side. The outside diameter of the accumulator piston 35 is only slightly smaller than the inside diameter of the blind-end bore 32 or the add-on piece 30 so that the accumulator piston 35 is guided properly with a sufficient seal-tightness. The depth of the blind-end bore 32 corresponds to the maximum absorptive volume of the low-pressure accumulator 24. The length dimensions of the accumulator piston 35 and the add-on piece 30 are conformed to each other so that the edge of the accumulator piston 35 moves into abutment on the bottom of the add-on piece 30 when the maximum absorptive volume is reached. In this arrangement, the bottom of the accumulator piston 35 is still in the blind-end bore 32 below the sealing ring 34. When the low-pressure accumulator 24 is empty, the bottom of the accumulator piston 35 bears against the bottom of the blind-end bore 32. For the sake of clarity, both situations (empty/full accumulator) are illustrated opposite each other in a semi-cross-section in the embodiment of FIG. 2.

The blind-end bore 32 is positioned below the transverse bore 18, as is shown in dash-dot lines in FIG. 1. permits drawing a straight connecting bore 40 between the blind-end bore 32 and the transverse bore 18.

The port of the connecting bore 40 into the blind-end bore 32 is steplike expanded and is used to accommodate a pump suction valve 41. Valve 41 comprises a disc with a central passage 43 and a valve closure member 44 which is also disc-shaped and has an axial extension 45 that extends through the passage 43 and is expanded hooklike at its ends in order to grip behind a circumferential strap 46 around the passage 43. The valve closure member 44 can be locked in the passage 43 of the disc, whereby a preassembled pump suction valve 41 is achieved which can be inserted into the port of the connecting bore 40.

The pump pressure valve 50 is formed similarly, and a valve spring 53 which defines the opening pressure of the pump pressure valve 50 is provided between the hook 51 and the valve disc 52. The pump pressure valve is inserted into the port of the transverse bore 18 into a damping chamber 60 which is also configured as a blind-end bore and is closed by a plate 61 that is inserted into a lateral surface of the valve block 1.

Because an angular cross-section was chosen, only one pump piston 17, one damping chamber 60 and one low-pressure accumulator 24 is illustrated in FIG. 2. Actually, as can be taken from FIG. 1, two opposite units are provided, and the pump pistons, opposed to each other, are supported on the eccentric 16.

The add-on piece 30 has roughly the same height as the actuators of the valves which are arranged in two rows, offset in parallel to the transverse bores 18, as can be seen in FIG. 1.

Figure 3:
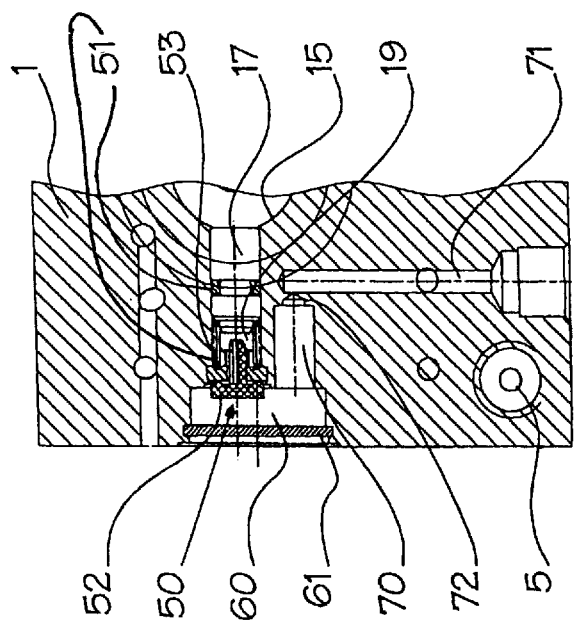
FIG. 3 is a cross-section taken through the valve block at the level of the pump pistons vertically to the cross-section in FIG. 2.

FIG. 3 shows a transverse bore 18 with a damping chamber 60 in another sectional plane, what makes it discernible that the blind-end bore which forms the damping chamber 60 is arranged offset relative to the transverse bore 18. In parallel to the transverse bore 18, a connecting bore 70 extends to a pressure-fluid channel 71 which opens into a lateral surface of the valve block 1 where it provides a connection for the master cylinder of the brake system.

The connecting bore 70 is greatly constricted directly in front of its opening into the pressure fluid channel 71 and forms an orifice 72 which effects noise reduction together with the damping chamber 60.

The magnetic coils 23 and the low-pressure accumulators 24 which are arranged on the bottom base 29 of the valve block 1 are covered by a housing cap 75, in the bottom of which the electronic controller 73 for the electric motor 2 and the magnetic coils 23 are arranged.

The housing cap 75 includes a central retaining rod 76 which is engaged and locked in a bore 77 disposed coaxially to the stepped bore 15. The housing cap 75 completely encloses the chamber in which the magnetic coils 23 and the low-pressure accumulators 24 are arranged so that these parts are protected against environmental influences, splashwater, impacts, etc. On the side where the electric motor 2 projects beyond the valve block 1, the housing cap 75 also projects beyond the valve block, and its lateral wall has a semicylindrical extension 78 which extends up to the electric motor 2. Provided between the lateral surface of the valve block and the semicylindrical extension 78 is a channel 79, through which the connecting cable 80 extends from the electric motor 2 to the electronic control unit. The free end of the extension 78 is in sealing abutment on the motor housing 10 and/or the bearing plate 3.

LIST OF REFERENCE NUMERALS

1 valve block
2 electric motor
3 bearing plate
4 base
5 wheel connections
6 edge
10 housing
11 rotor
12 shaft
13 bearing
14 bearing
15 stepped bore
16 eccentric
17 pump piston
18 transverse bore
19 pump chamber
20 brush case
21 conductive tracks
22 brushes
23 magnetic coils
24 low-pressure accumulator
29 base
30 add-on piece
31 edge
32 blind-end bore
33 step
34 sealing ring
35 accumulator piston
16 accumulator spring
40 connecting bore
41 pump suction valve
43 passage
44 valve closure member
45 extension
46 strap
50 pump pressure valve
51 hook
52 disc
53 valve spring
60 damping chamber
61 plate
70 connecting bore
71 pressure-fluid channel
72 orifice
73 electronic controller
75 housing cap
76 retaining rod
77 bore
78 extension
79 channel
80 connecting cable

What is claimed is:

1. A hydraulic unit, comprising:
   a valve block including a first base;
   at least one electromagnetically operable valve arranged within the valve block and having a drive element arranged outside the valve block;
   a low-pressure accumulator attached to the first base of the valve block in parallel with the drive element, the low-pressure accumulator including a housing, at least a portion of the housing comprising an add-on piece projecting from the first base of the valve block, the add-on piece having a bowl-shaped configuration with an edge forming a blind-end bore that opens into the first base of the valve block;
   an accumulator piston having a bowl-shaped configuration with its open side inserted within the add-on piece; and
   a housing cap attached to the first base of the valve block and covering the drive element and the add-on piece.

2. The hydraulic unit according to claim 1, wherein the accumulator piston and the add-on piece form a closed chamber therebetween, the closed chamber having a volume generally corresponding to a maximum absorptive volume of the low-pressure accumulator.

3. The hydraulic unit according to claim 1, wherein the valve block includes a plurality of electromagnetically operable valves, the valves being arranged side by side on the base and adjacent to the add-on piece.

4. The hydraulic unit according to claim 1, wherein the blind-end bore of the valve block includes a step forming a groove having a sealing ring disposed therein, the sealing ring being retained by the step of the blind-end bore and the edge of the add-on piece.

5. The hydraulic unit according to claim 1, wherein a straight connecting bore extends between the blind-end bore and a transverse bore for accommodating a pump piston.

6. The hydraulic unit according to claim 5, further including a pump suction valve inserted into a mouth of the connecting bore.

7. The hydraulic unit according to claim 1, further including a pump pressure valve inserted into a transverse bore.

8. The hydraulic unit according to claim 7, further including a plate inserted into a lateral surface of the valve block, the plate and the pump pressure valve forming a damping chamber therebetween.

9. The hydraulic unit according to claim 8, further including a connecting bore extending from the damping chamber to a pressure-fluid channel, the connecting bore including an orifice having a diameter smaller than a diameter of a remainder of the connecting bore to form a mouth into the pressure-fluid channel.

10. The hydraulic unit according to claim 7, wherein the pump pressure valve comprises a valve seat member including a passage and a valve closure member, the valve closure member including an extension that extends through the passage and includes a hook at each end of the extension for locking the valve closure member in the passage.

11. The hydraulic unit according to claim 1, wherein the housing cap has a larger lateral length than the valve block, a portion of the housing cap extending from the valve body to a second base of the valve block, the second base opposite the first base.

12. The hydraulic unit according to claim 11, further including an electric motor for driving a pump attached to the second base, and an electric controller arranged in the housing cap, wherein an electrical connection extends between the electric motor and an electronic controller in a channel formed between the housing cap and the valve block.

13. The hydraulic unit according to claim 12, wherein the channel formed between the housing cap and the valve block is semicircular in cross-section.

* * * * *